O. W. NOBLE.
Coffee-Pot.

No. 208,032.　　　　　　　　Patented Sept. 17, 1878.

Witnesses,
W. J. Cambridge
J. E. Cambridge

Inventor,
Oscar W. Noble,
Per Teschemacher & Stearns
Attorneys.

UNITED STATES PATENT OFFICE

OSCAR W. NOBLE, OF WAKEFIELD, MASSACHUSETTS.

IMPROVEMENT IN COFFEE-POTS.

Specification forming part of Letters Patent No. 208,032, dated September 17, 1878; application filed July 12, 1878.

*To all whom it may concern:*

Be it known that I, OSCAR W. NOBLE, of Wakefield, in the county of Middlesex and State of Massachusetts, have invented certain Improvements in Coffee-Pots, of which the following is a full, clear, and exact description, reference being had to the accompanying drawings, making part of this specification, in which—

Figure 1:
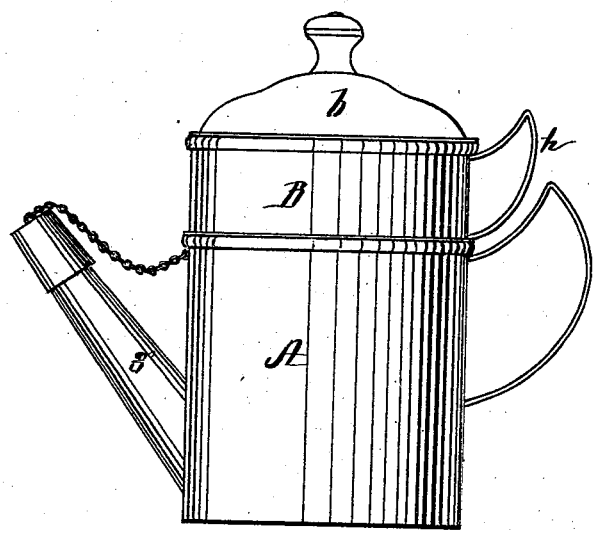
Figure 2:
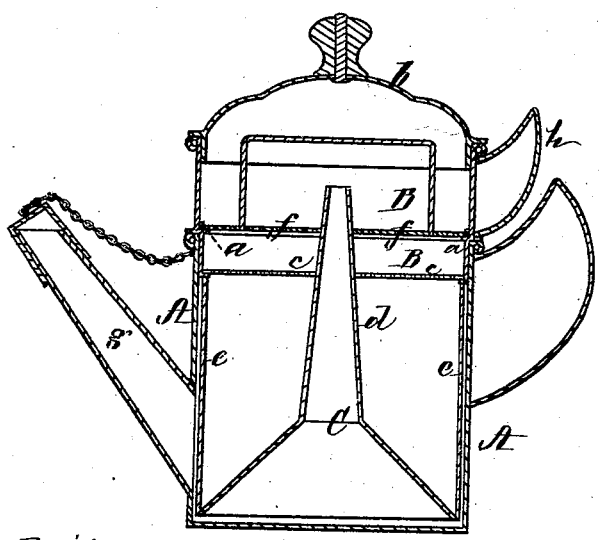
Figure 3:
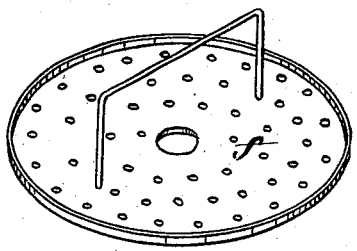

Figure 1 is a side elevation of a coffee-pot constructed in accordance with my invention. Fig. 2 is a vertical section through the center of the same; Fig. 3, detail in perspective.

My invention relates to that class of coffee-pots in which a circulation of boiling water is kept up through the coffee, which is located above the water in the pot; and it consists in a coffee-pot provided with a detachable cup-shaped projection provided with a handle, a perforated bottom, a funnel inverted, and a loose perforated plate, the whole being removable at the same time, whereby the operation of cleansing the pot is greatly facilitated by making the funnel removable with the coffee-chamber.

To enable others skilled in the art to understand and use my invention, I will proceed to describe the manner in which I have carried it out.

In the said drawings, A represents the body of a coffee-pot, within the top of which is snugly fitted a shallow cup-shaped removable receptacle, B, provided with a handle, $h$, forming an extension of the main body of the pot, and which forms the chamber for the reception of the ground coffee, the upper surface of which is not intended to be above the ledge $a$. The receptacle B is provided with a tightly-fitting cover, $b$, and a perforated bottom, $c$, up through which extends the tapering vertical tube $d$ of an inverted funnel, C, which is permanently secured to the receptacle B by means of vertical braces $e$ and the soldering of the tube $d$ to the bottom $c$, the inverted funnel being thus held suspended within the pot A, with the lower edge of its flaring mouth a short distance above the bottom of the pot, the diameter of the funnel being slightly less than that of the interior of the pot in order to allow of the free passage of the water under the edge of the funnel.

The ground coffee having been placed in the coffee-chamber B, a circular perforated plate, $f$, is placed thereover, so as to rest on the ledge $a$, and the required quantity of water introduced within the pot A, which is then placed upon the top of the stove or over the fire to boil. As soon as the water becomes heated the pressure of the steam causes it to be forced up the vertical tube $d$, from the top of which it is discharged onto the upper surface of the plate $f$, through the perforations of which it passes into contact with the coffee beneath, and thence through the perforated bottom $c$ into the pot A below, the plate $f$ thus serving as a distributer to diffuse the water over the entire surface of the coffee as required to produce the thorough intermixture of the two. The boiling water, after descending through the coffee into the pot, passes up under the lower edge of the funnel C, and is again forced up the tube $d$, as before, the operation being continuous as long as the water boils, and a perfect circulation of the boiling liquid is thus effected, which accelerates the process of making the coffee, and extracts and retains all of the essence and flavor thereof without producing any bitter taste.

After the coffee has been made the receptacle B and funnel C are removed together from the pot, and the cover $b$ removed from the receptacle B and applied to the top of the pot A, when the latter is ready to be placed upon the table, the pot being provided, as usual, with a spout, $g$.

By permanently securing the funnel C to the coffee-receptacle B, so that they can both be lifted together out of the pot A with the greatest facility, the interior of the latter is left free and unobstructed, and the operation of cleansing the same is thus greatly facilitated.

I am aware that coffee-pots have heretofore been made in which there is an inverted funnel located midway the height of the coffee-pot, leading water to a chamber below the water-line containing ground coffee, said funnel being removable with the coffee-containing chamber.

I am also aware that coffee-pots have heretofore been made with a removable interior funnel and a coffee-containing chamber located above the water-line, the coffee-chamber and funnel being removable separately, and hence I do not make claim to any device interfering with such constructions; but,

Having thus described my invention, what I claim as new, and desire to secure by Letters Patent, is—

In a water-circulating coffee-pot, the detachable cup-shaped projection B of the main body of the pot, provided with a handle, h, a perforated bottom, c, funnel C, and loose perforated plate f, the whole being removable at one and the same time by said handle h, in combination with the main body of the pot A, as set forth.

Witness my hand this 8th day of July, A. D. 1878.

OSCAR W. NOBLE.

In presence of—
  ALEXANDER TURNBULL,
  B. B. BURBANK.